United States Patent [19]

Quad et al.

[11] Patent Number: 4,906,834
[45] Date of Patent: Mar. 6, 1990

[54] INFRARED DETECTOR CIRCUIT HAVING A RESISTOR SERIES CONNECTED TO THE DETECTOR TO LIMIT THE CURRENT ACROSS THE PN JUNCTION OF THE FET

[75] Inventors: Reiner Quad, Taunusstein; Udo Ringelstein, Lorch, both of Fed. Rep. of Germany

[73] Assignee: Heimann GmbH, Fed. Rep. of Germany

[21] Appl. No.: 256,463

[22] Filed: Oct. 12, 1988

[30] Foreign Application Priority Data

Oct. 26, 1987 [DE] Fed. Rep. of Germany ....... 8714248

[51] Int. Cl.$^4$ ............................................. H01J 40/14
[52] U.S. Cl. .............................. 250/214 A; 250/338.1
[58] Field of Search .... 250/214 A, 214 AL, 214 AG, 250/214 C, 214 L, 214 R, 214 RC, 338.1, 338, 342, 349; 330/59, 277, 308; 455/616, 617, 619

[56] References Cited

U.S. PATENT DOCUMENTS

| | | | |
|---|---|---|---|
| 4,198,564 | 4/1980 | Baker et al. | 250/338 |
| 4,437,003 | 3/1984 | Doctor | 250/338 |
| 4,441,023 | 4/1984 | Doctor et al. | 250/338 |
| 4,620,321 | 10/1986 | Chown | 250/214 A |
| 4,688,267 | 8/1987 | Chown et al. | 250/214 A |
| 4,750,217 | 6/1988 | Smith et al. | 455/619 |
| 4,755,674 | 7/1988 | Schaaf | 250/338.1 |
| 4,808,810 | 2/1989 | Van Doorn | 250/214 A |

FOREIGN PATENT DOCUMENTS 2021761  5/1979  United Kingdom .

OTHER PUBLICATIONS

"Pyroelectric Infrared Detectors", Rose, Electronic Components and Applications, vol. 4, No. 3, May 1982, pp. 142-149.

Primary Examiner—David C. Nelms
Assistant Examiner—William L. Oen
Attorney, Agent, or Firm—Hill, Van Santen, Steadman & Simpson

[57] ABSTRACT

A circuit for an infrared detector includes a field effect transistor and a gate resistor connected thereto. A current-limiting component, preferably an ohmic resistor, is connected in series with the detector element between the gate of the field effect transistor and ground, to limit the current across the pn junction of the field effect transistor.

3 Claims, 1 Drawing Sheet

INFRARED DETECTOR CIRCUIT HAVING A RESISTOR SERIES CONNECTED TO THE DETECTOR TO LIMIT THE CURRENT ACROSS THE PN JUNCTION OF THE FET

BACKGROUND OF THE INVENTION

1. Field of the Invention

The present invention is directed to a circuit for an infrared detector, and in particular to such a circuit having a field effect transistor connected to a gate resistor.

2. Description of the Prior Art

One of the critical demands made of infrared detectors is low noise. In known circuits for operating such infrared detectors, noise voltages are generated by several sources. Such circuits having a high-impedance gate resistor, which may be formed by a diode, which constitutes a source of noise voltage. Additionally, the field effect transistor has a gate leakage current which results in a voltage drop at the gate resistor (resistance noise), and the transistor also generates channel voltage noise.

Although the magnitude of the resistance noise cannot be influenced, the frequency or phase behavior of the noise can be shifted by using pyroelectric materials having high capacitance. It is thus important to consider the correct parameters in the selection of the field effect transistors which are used. Gate leakage currents as small as one picoampere may result in a noticeable increase in the noise voltage.

Among semiconductor components, field effect transistors are in a class of such components which are particularly sensitive to voltages. Because excessive temperature stresses on the components during manufacture, storing and manipulation cannot always be avoided, such stresses can result in the generation of charges both by the pyroelectric effect of the materials, and the piezoelectric effect during mechanical stressing. Such charges can easily elicit voltages above the gate punch through voltages. A transgression of this gate punch through voltage can cause defects at the pn junction of the field effect transistor which in turn increase the gate leakage current both as a chronological average and in the occurrence of peaks. This results in an increase in the overall noise.

SUMMARY OF THE INVENTION

It is an object of the present invention to provide a circuit for an infrared detector, which includes a field effect transistor, wherein the current across the pn junction of the field effect transistor is limited so that substantially no noise caused by temperature influences or mechanical stressing occurs.

The above object is achieved in accordance with the principles of the present invention in a circuit for an infrared detector having a current-limiting component connected in series with the detector element between the gate of the field effect transistor and ground. The current-limiting (protective) component is preferably a high-impedance resistor, and is connected in the circuit between the gate of the field effect transistor and the ground terminal of the circuit.

DESCRIPTION OF THE PREFERRED EMBODIMENTS

Figure 1:
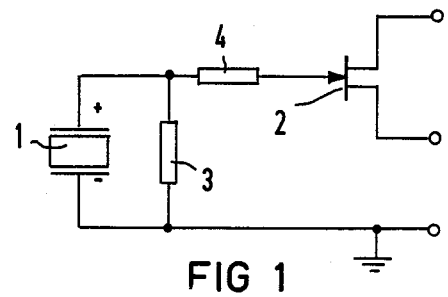
FIGS. 1 through 5 are circuit diagrams respectively showing five different embodiments of a circuit for an infrared detector constructed in accordance with the principles of the present invention.
Figure 2:
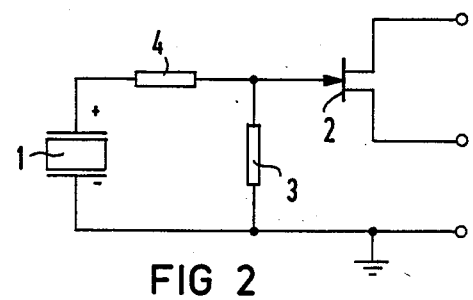
Figure 3:
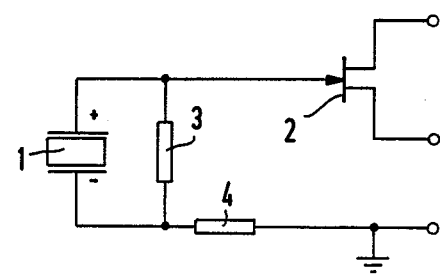
Figure 4:
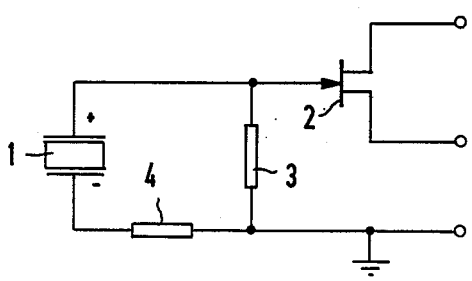

The embodiment of the circuit shown in FIG. 1 includes a pyroelectric detector element 1 followed by a field effect transistor 2. The field effect transistor 2 has a gate resistor 3 allocated thereto. A current-limiting component, in the form of a resistor 4, is connected in the circuit between the gate of the field effect transistor 2 and the ground terminal of the circuit. The resistor in FIGS. 1 and 2 may be arranged between the detector element 1 and the gate of the field effect transistor 2, and in the embodiments of FIGS. 3 and 4, can be connected between the detector element 1 and ground.

Figure 5:
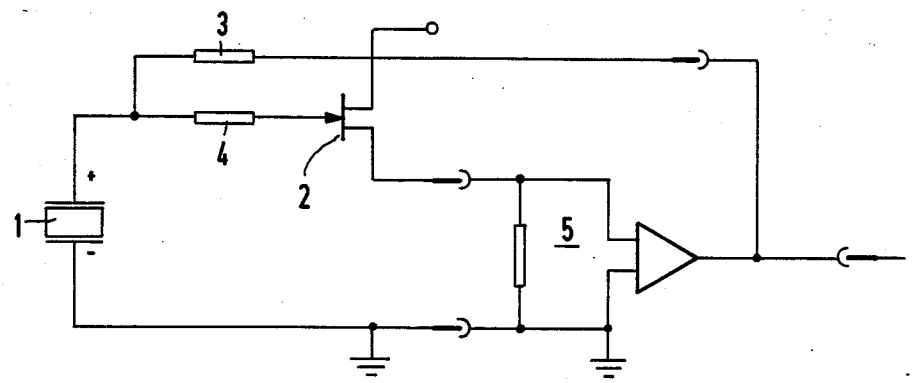

An operational amplifier 5 is shown in the embodiment of FIG. 5 following the field effect transistor 2. In this embodiment, the resistor 4 is connected between the detector element 1 and the gate of the field effect transistor 2.

The current-limiting element can be an ohmic resistor having a selected high-impedance. The impedance cannot be so high, however, that it degrades the function of the circuit. In practice, the use of a resistor 4 as the current-limiting element having a resistance in the range of 100 kOhm and 100 Mohm is preferred. A good protective effect is, however, already achieved with a resistor having a resistance of 1 kOhm.

Although modifications and changes may be suggested by those skilled in the art it is the intention of the inventors to embody within the patent warranted hereon all changes andmodifications as reasonably and properly come within the scope of their contribution to the art.

We claim as our invention:

1. A circuit comprising:
   an infrared detector element;
   a field effect transistor having a gate;
   a gate resistor connected to said gate of said field effect transistor; and
   a current-limiting component connected in series with said infrared detector element between said gate of said field effect transistor and ground.

2. A circuit as claimed in claim 1, wherein said current-limiting component is high-impedance resistor.

3. A circuit as claimed in claim 2, wherein said high-impedance resistor has a resistance value in the range between 100 kOhm and 100 Mohm.

3. A circuit as claimed in claim 2, wherein said high-impedance resistor has a resistance value in the range between 100 kOhm and 100 Mohm.

* * * * *